US008422059B2

(12) United States Patent
Muto

(10) Patent No.: US 8,422,059 B2
(45) Date of Patent: Apr. 16, 2013

(54) INFORMATION PROCESSING APPARATUS AND CONTROL METHOD THEREFOR

(75) Inventor: Shin Muto, Kawasaki (JP)

(73) Assignee: Canon Kabushiki Kaisha (JP)

( * ) Notice: Subject to any disclaimer, the term of this patent is extended or adjusted under 35 U.S.C. 154(b) by 920 days.

(21) Appl. No.: 12/499,795

(22) Filed: Jul. 8, 2009

(65) Prior Publication Data

US 2010/0007918 A1 Jan. 14, 2010

(30) Foreign Application Priority Data

Jul. 9, 2008 (JP) ................................ 2008-179053

(51) Int. Cl.
*G06F 3/12* (2006.01)

(52) U.S. Cl.
USPC .......................................... 358/1.15; 358/1.1

(58) Field of Classification Search .................. 358/1.1, 358/1.15
See application file for complete search history.

(56) References Cited

U.S. PATENT DOCUMENTS

| | | | | |
|---|---|---|---|---|
| 2004/0057074 | A1 | 3/2004 | Ohishi et al. | |
| 2005/0231747 | A1* | 10/2005 | Bledsoe et al. .............. | 358/1.13 |
| 2009/0024531 | A1* | 1/2009 | Yamahata et al. .............. | 705/55 |

FOREIGN PATENT DOCUMENTS

| | | | |
|---|---|---|---|
| JP | 2001-357123 | A | 12/2001 |
| JP | 2003-303248 | A | 10/2003 |
| JP | 2004-110779 | A | 4/2004 |

* cited by examiner

*Primary Examiner* — King Poon
*Assistant Examiner* — Iriana Cruz
(74) *Attorney, Agent, or Firm* — Rossi, Kimms & McDowell LLP

(57) ABSTRACT

An information processing apparatus capable of freely and dynamically defining a releasing procedure of a using limitation of an apparatus and an deleting procedure for information held in an apparatus by a manager. An acquisition unit acquires information about an expiration date of the apparatus. A first determination unit determines whether the expiration date expires based on the acquired information. A limitation unit limits use of the apparatus when the expiration date expires. A registration unit registers a specific processing procedure executed by the apparatus as work flow information. A second determination unit determines whether the work flow information has been registered. A third determination unit determines whether a user instructs an execution of the processing procedure when the work flow information has been registered. An execution unit executes the processing procedure under the use limited condition, when the user instructs the execution of the processing procedure.

4 Claims, 11 Drawing Sheets

*FIG.5*

501

```
<?xml version= "1.0" encoding= "utf-8" ?>
<Elements xmlns = "http://schemas.xxxx.com/workflow/" >
    <Workflow ~ 502
        Name= "RELEASING OPERATION"
        Description= "DISABLE CONDITION WILL BE RELEASED."
        Id= "C9964DCF-RG8D-4E2C-AC32-B6D7617FCB"  ~ 503
        ExecuteMethod= "com/xxx/method/authentication.exe"  ~ 504
        ExecuteMethod= "com/xxx/method/get_license_key.exe"  ~ 505
        ExecuteMethod= "com/xxx/method/send_access_log.exe" >  ~ 506
    </Workflow>
</Elements>
```

FIG.10

1000

```
<?xml version= "1.0" encoding= "utf-8" ?>
<Elements xmlns = "http://schemas.xxxx.com/workflow/" >
        <Workflow
                Name= "DATA DELETION" ~ 1001
                Description= "WORK FLOW FOR DELETING PERSONAL
                INFORMATION DATA IN MULTIFUNCTIONAL APPARATUS XXX"
                Id= "CB14-EFFF-2390-F725-D6D5647210" ~ 1002
                ExecuteTimes=1 ~ 1003
                ExecuteMethod= "com/xxx/method/delete_with_confirm.exe/user/*.det" ~ 1004
                ExecuteMethod= "com/xxx/method/delete_with_confirm.exe/address/*"> ~ 1005
                Autoclear=YES ~ 1006
        </Workflow>
</Elements>
```

INFORMATION PROCESSING APPARATUS AND CONTROL METHOD THEREFOR

BACKGROUND OF THE INVENTION

1. Field of the Invention

The present invention relates to an information processing apparatus whose expiration date has been set, and a control method therefor. More particularly, the present invention relates to an information processing apparatus and a control method therefor featuring setting and releasing techniques of an expiration date.

2. Description of the Related Art

In recent years, there are an application and an information device (an information processing apparatus) that are limited in an expiration period or a function, such as a trial version application.

Japanese laid-open patent publication (Kokai) No. 2003-303248 (JP2003-303248A) discloses a technique of releasing a limitation of a period or a function in an application and an information device that are provided with the above-mentioned mechanism by inputting an authorized license key, for example.

Japanese laid-open patent publication (Kokai) No. 2004-110779 (JP2004-110779A) discloses a technique of incorporating a new external application and of operating the external application when inputting a license key, in a multifunctional apparatus that includes functions of respective apparatuses such as a printer, a copier, a facsimile, and a scanner in a single body.

Japanese laid-open patent publication (Kokai) No. 2001-357123 (JP 2001-357123A) discloses a technique of connecting a leased printer device to a management server via the Internet and of sending information about operating conditions from the printer device to the management server at predetermined intervals. The management server manages the information about expiration date, and transmits a use stop signal to the printer device whose expiration date expires to stop a future use of the printer device.

The above-described conventional techniques of releasing a limitation of a period or a function, which include the technique of releasing a limitation by inputting a license key as described above, statically define a releasing procedure in an application or an information device beforehand.

Therefore, even if a user or a manager wants to change a releasing procedure according to an operating condition of a device (for example, when the user wants to disable a license key that came to hand in an unauthorized route), or even if the user or the manager wants to change a releasing procedure according to a utilizing environment of a device (for example, when the user wants to limit a releasing person in association with personal authentication), there has been a problem of lack of freedom to change the releasing procedure.

A multifunctional apparatus in recent years can accumulate electronic filing documents and can hold personal information such as destination address data and user authentication data.

When a user returns a multifunctional apparatus after an expiration date in a rental contract etc., it is necessary not only to stop use of an application, but also to delete electrical documents and personal information stored in the multifunctional apparatus certainly in order to prevent a leakage of such information.

However, since an operation to delete personal information etc. must be usually performed by a person such as a user or a manager of the multifunctional apparatus, there is a security problem of forgetting to delete the personal information, etc.

SUMMARY OF THE INVENTION

The present invention provides an information processing apparatus and a control method therefor capable of freely and dynamically defining a releasing procedure of a using limitation of an apparatus whose expiration date has been set and a deleting procedure for information held in an apparatus by a manager.

Accordingly, a first aspect of the present invention provides An image processing apparatus comprising an acquisition unit adapted to acquire information about an expiration date of the information processing apparatus, a first determination unit adapted to determine whether the expiration date of the apparatus expires or not based on the information acquired by the acquisition unit, a limitation unit adapted to limit use of the information processing apparatus when the first determination unit determines that the expiration date expires, a registration unit adapted to register a specific processing procedure that is executed by the information processing apparatus as work flow information, a second determination unit adapted to determine whether the work flow information has been registered, a third determination unit adapted to determine whether a user instructs an execution of the processing procedure of the work flow information concerned when the second determination unit determines that the work flow information has been registered, and an execution unit adapted to execute the processing procedure described in the work flow information under the condition where the use of the information processing apparatus is limited by the limitation unit, when the third determination unit determines that the user instructs the execution of the processing procedure.

Accordingly, a second aspect of the present invention provides a control method for an information processing apparatus, comprising an acquisition step of acquiring information about an expiration date of the information processing apparatus, a first determination step of determining whether the expiration date of the apparatus expires or not based on the information acquired in the acquisition step, a limitation step of limiting use of the information processing apparatus when it is determined that the expiration date expires in the first determination step, a registration step of registering a specific processing procedure that is executed by the information processing apparatus as work flow information, a second determination step of determining whether the work flow information has been registered, a third determination step of determining whether a user instructs an execution of the processing procedure of the work flow information concerned when it is determined that the work flow information has been registered in the second determination step, and an execution step of executing the processing procedure described in the work flow information under the condition where the use of the information processing apparatus is limited in the limitation step, when it is determined that the user instructs the execution of the processing procedure in the third determination step.

According to the present invention, a manager is able to freely and dynamically define a releasing procedure of a using limitation of an apparatus whose expiration date has been set and a deleting procedure for information held in the apparatus.

The features and advantages of the invention will become more apparent from the following detailed description taken in conjunction with the accompanying drawings.

BRIEF DESCRIPTION OF THE DRAWINGS

FIG. 5 is a view showing a work flow definition file that describes a processing procedure that can be executed when the expiration date of the multifunctional apparatus of FIG. 2 expires.

FIG. 10 is a view showing a work flow definition file, which describes a personal information deletion procedure, in the multifunctional apparatus of FIG. 2.

DESCRIPTION OF THE PREFERRED EMBODIMENTS

Hereafter, embodiments according to the present invention will be described in detail with reference to the drawings.

Figure 1:
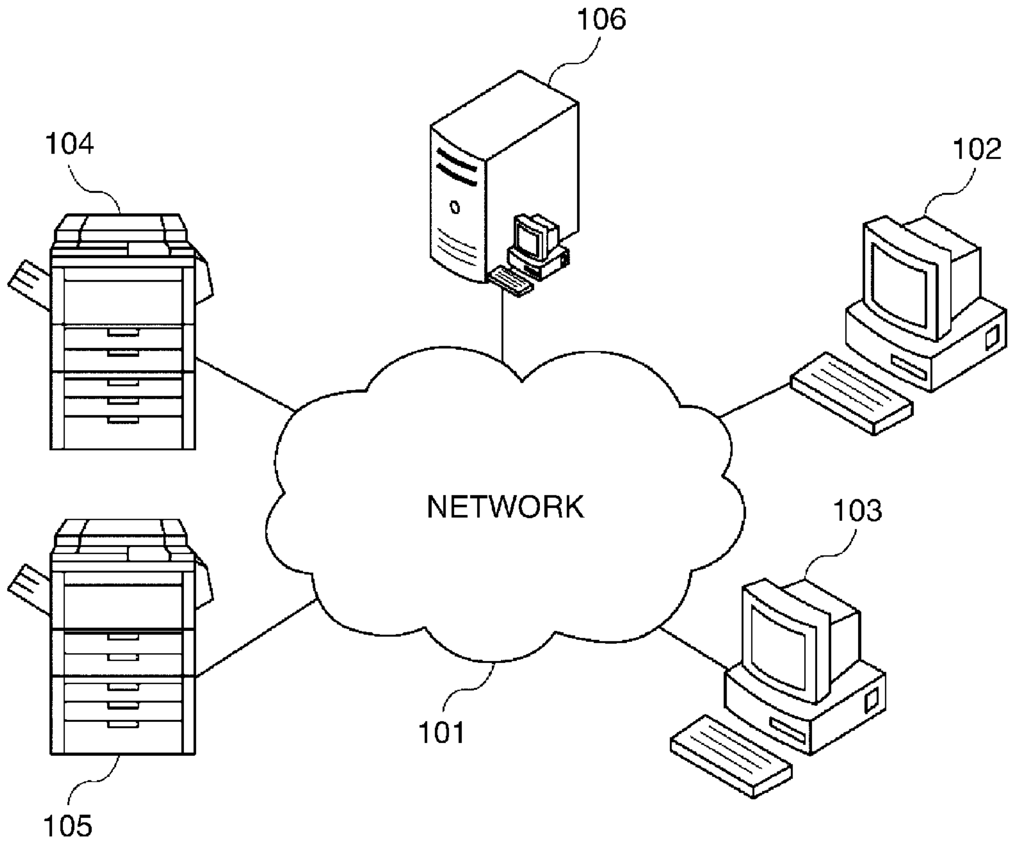
FIG. 1 is a schematic view showing a configuration of a network system including an information processing apparatus according to an embodiment of the present invention.

FIG. 1 is a schematic view showing a configuration of a network system including an information processing apparatus according to an embodiment of the present invention.

In FIG. 1, the network system is provided with client computers 102 and 103, multifunctional apparatuses (information processing apparatuses) 104 and 105, and a server 106 holding work flow information. These apparatuses are connected via a network 101 that supports the TCP/IP protocol, for example.

For example, a user creates a work flow information file, which defines a series of operating procedures or processing procedures required to release a using limitation for the multifunctional apparatus 104 or 105, by the client computer 102 or 103, and saves it to the server 106.

The server 106 delivers the held work flow information (the work flow information file) to the multifunctional apparatuses 104 and 105 through the network 101. The delivered work flow information is held in recording media in the multifunctional apparatuses 104 and 105.

The user can display or edit the work flow information saved in the server 106 on the client computer 102 or 103.

The information processing apparatus is not only limited to the multifunctional apparatuses 104 and 105. A discrete device such as a printer or a scanner may be connected to the network 101 as an information processing apparatus. Further, the network system may be configured so that the user sends the work flow information from the client computer 102 or 103 to the multifunctional apparatus 104 or 105 directly without routing through the server.

Figure 2:
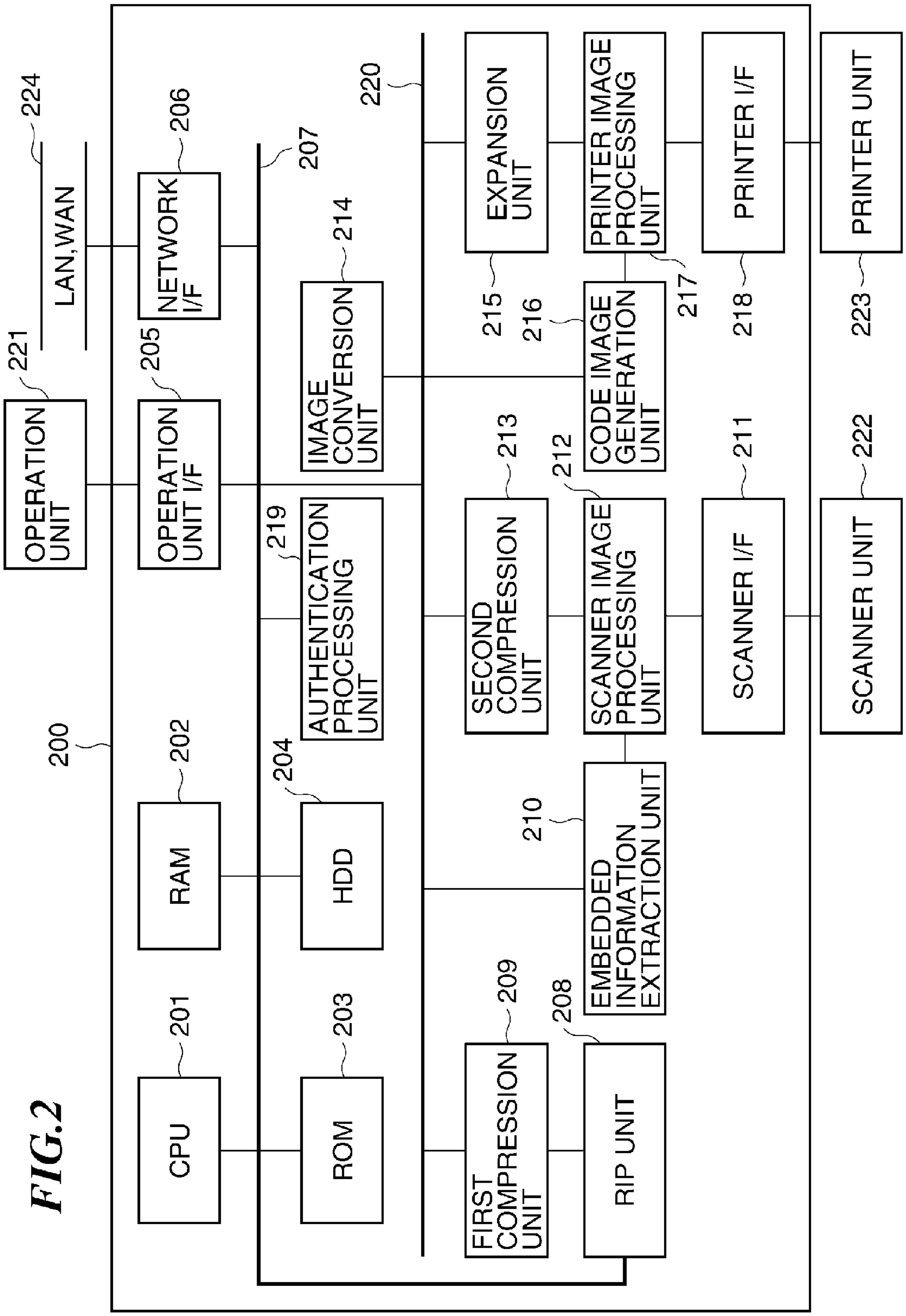
FIG. 2 is a block diagram showing an outline configuration of a multifunctional apparatus in FIG. 1.

FIG. 2 is a block diagram showing an outline configuration of the multifunctional apparatus in FIG. 1.

In FIG. 2, a CPU 201 totally controls accesses to various devices connected to a system bus 207 according to a control program stored in a ROM 203 or an HDD 204. At the same time, the CPU 201 totally controls various processes executed inside a controller 200.

The RAM 202 is a system work memory for the operation of the CPU 201, and is also an image memory for storing image data temporarily. The boot program and the like for the apparatus are stored in the ROM 203.

The HDD 204 is a hard disk drive and can store work flow information and expiration date information according to the present invention in addition to system software, image data, address information, and personal authentication information.

An operation unit I/F 205 is an interface for connecting an operation unit 221 to the system bus 207. The operation unit I/F 205 receives the image data for displaying on the operation unit 221 from the system bus 207, outputs it to the operation unit 221, and outputs the information inputted from the operation unit 221 to the system bus 207.

A network I/F 206 connects with a LAN, a WAN 224, and the system bus 207, and exchanges data with other devices in both directions.

An RIP unit 208 receives intermediate data generated based on PDL coded data, and generates bit map data (multiple value). The generated bit map data is compressed by a first compression unit 209, and is sent to a image bus 220.

The image bus 220 is a transmission route for exchanging image data, and consists of a PCI bus or an IEEE1394.

A scanner image processing unit 212 corrects, processes, and edits image data received from a scanner unit 222 through a scanner I/F 211. An embedded information extraction unit 210 detects a pattern embedded in a background image from image data, and extracts additional information.

A second compression unit 213 receives image data and compresses the data. An expansion unit 215 expands data, executes raster development, and sends the data to a printer image processing unit 217.

An image conversion unit 214 applies predetermined conversion processes, such as a rotation, a color space conversion, a binary-multilevel conversion, an image composition, and a subsampling, to image data.

A code image generation unit 216 generates code image data such as a two-dimensional code image, a bar code image, and an image generated by an information embedding technique. Information read from a memory card slot (not shown) by the CPU 201 or information inputted by the operation unit 221 is used for image generation.

The printer image processing unit 217 receives the image data sent from the expansion unit 215, and applies an image processing to image data while referring to attribute data associated to the image data. Receiving an instruction, the printer image processing unit 217 superimposes the code image data generated by the code image generation unit 216 on the image data.

It should be noted that the code image is generated by executing a program stored in the RAM 202. The image data to which the image processing has been applied is outputted to a printer unit 223 through a printer I/F 218.

An authentication processing unit 219 authenticates a print job in addition to authentications of a user and a workgroup using user information inputted from the operation unit 221.

Figure 3:
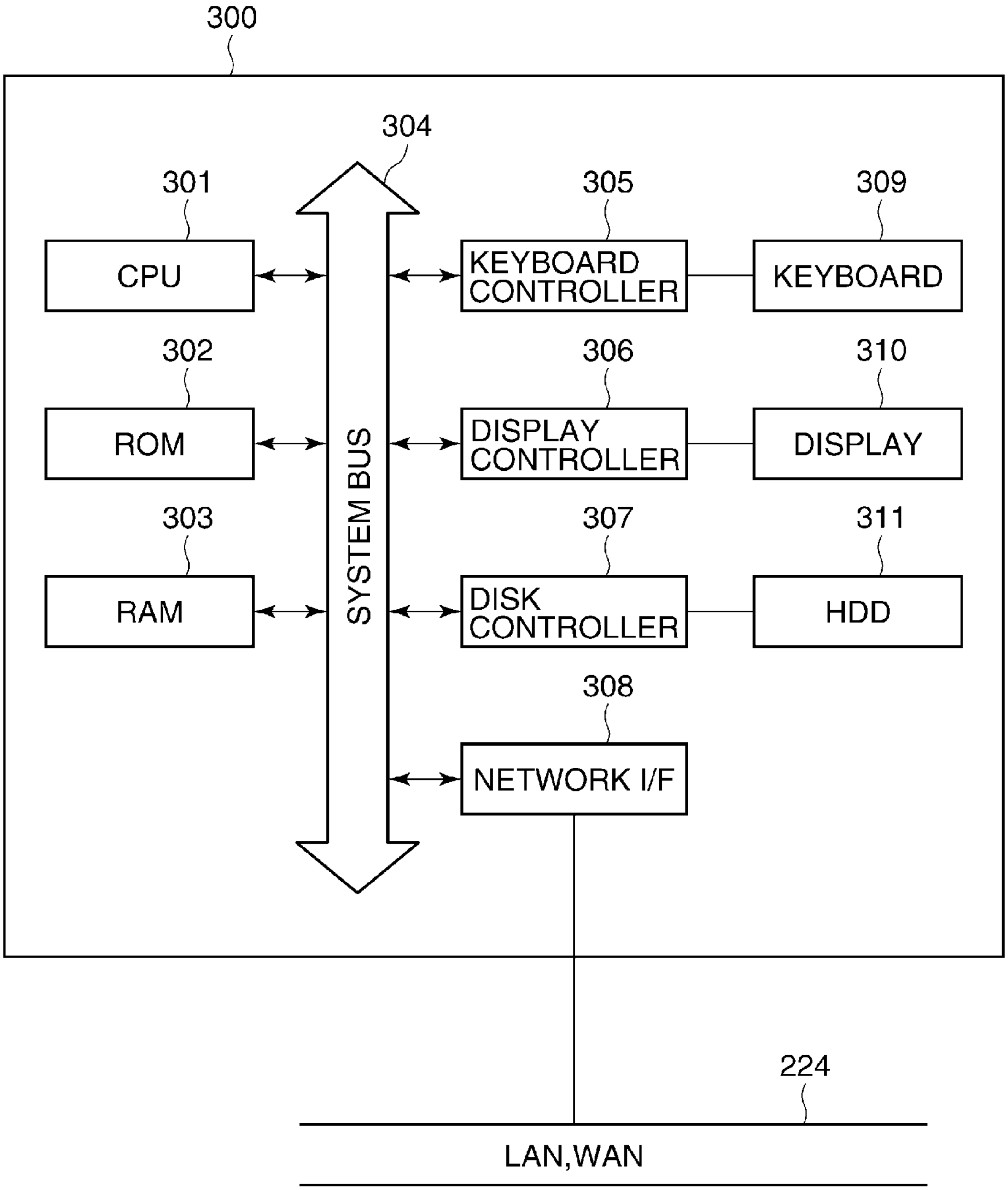
FIG. 3 is a block diagram showing an outline configuration of a client computer or a server in FIG. 1.

FIG. 3 is a block diagram showing an outline configuration of the client computer or the server in FIG. 1.

In FIG. 3, a PC 300 that constitutes the client computer 102 or 103, or the server 106 that holds the work flow information file is provided with a CPU 301 that executes software stored in a ROM 302 or an HDD 311. The CPU 301 totally controls the respective devices connected to a system bus 304.

A RAM 303 functions as a main memory, a work area and the like of the CPU 301. A keyboard controller 305 controls an instruction inputted from a keyboard 309.

A display controller 306 controls an indication of a display 310 that is a display module such as a liquid crystal display.

A disk controller 307 controls the HDD 311 that is a bulk storage device.

A network I/F 308 exchanges data with other devices through the LAN and WAN 224 in both directions.

Figure 4:
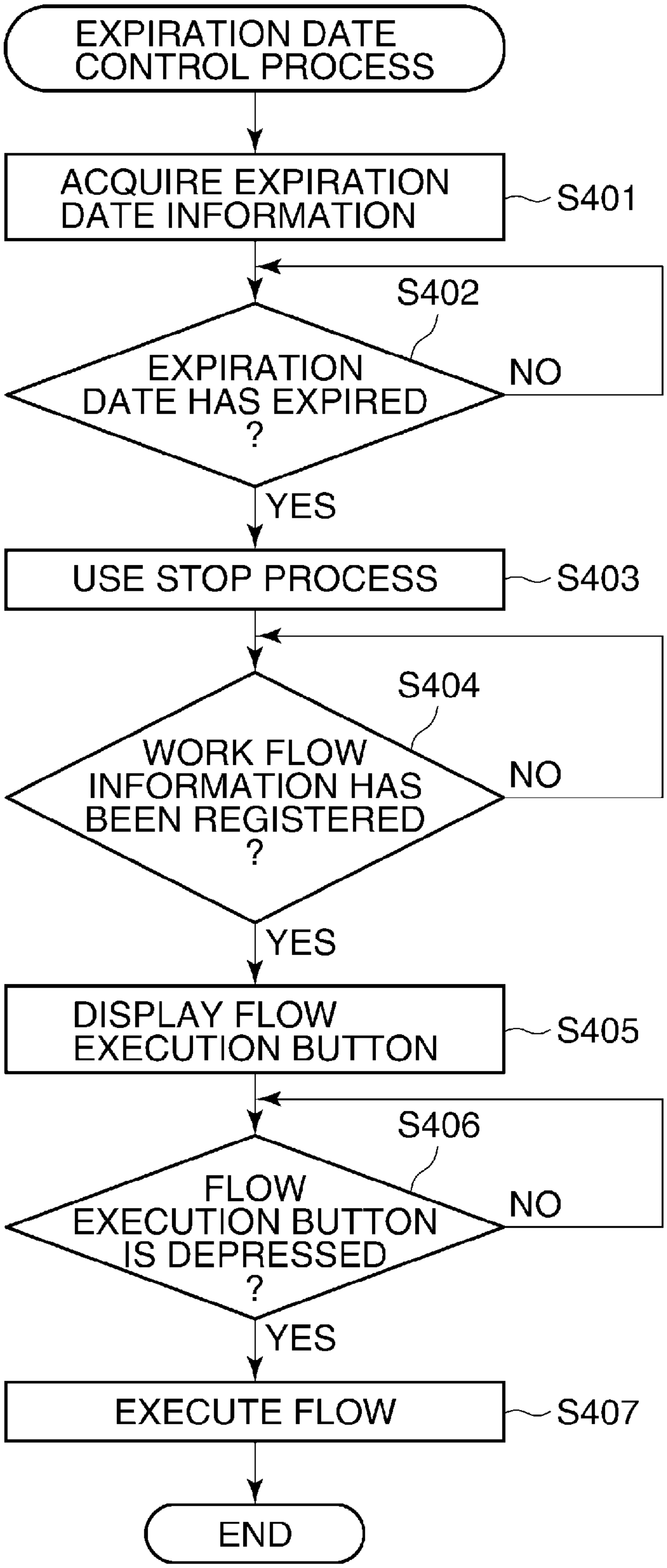
FIG. 4 is a flowchart showing a procedure of an expiration date control process executed by the multifunctional apparatus of FIG. 2.

FIG. 4 is a flowchart showing a procedure of an expiration date control process executed by the multifunctional apparatus of FIG. 2.

The expiration date control program is stored in the ROM 203 or the HDD 204 in the controller 200 in FIG. 2. The CPU 201 in the controller 200 loads the control program into the RAM 202 and then executes the loaded program.

It should be noted that FIG. 4 shows the processing procedure in the multifunctional apparatus 104 or 105 (hereinafter, represented by the multifunctional apparatus 104) whose expiration date has been set beforehand.

First, the CPU 201 acquires the expiration date information that has been set in the multifunctional apparatus 104 in step S401. Then, the CPU 201 compares the date information included in the expiration date information with the current date information, and determines whether the expiration date expires or not (whether the current date reaches the expiration date or not) in step S402

When the expiration date has expired, the CPU 201 proceeds with the process to step S403 and executes a use stop process for the multifunctional apparatus 104. The use stop process brings about a condition where a function whose expiration date has been set beforehand cannot be executed. For example, a screen shown in FIG. 7 is displayed on the operation unit 211 and a user's operation and an execution of the function concerned are prohibited.

In step S404, the CPU 201 determines whether the work flow information that defines the processing procedure for releasing the use limitation shown in FIG. 5 has been registered in the storage area such as the HDD 204 of the multifunctional apparatus 104 or not.

Figure 7:
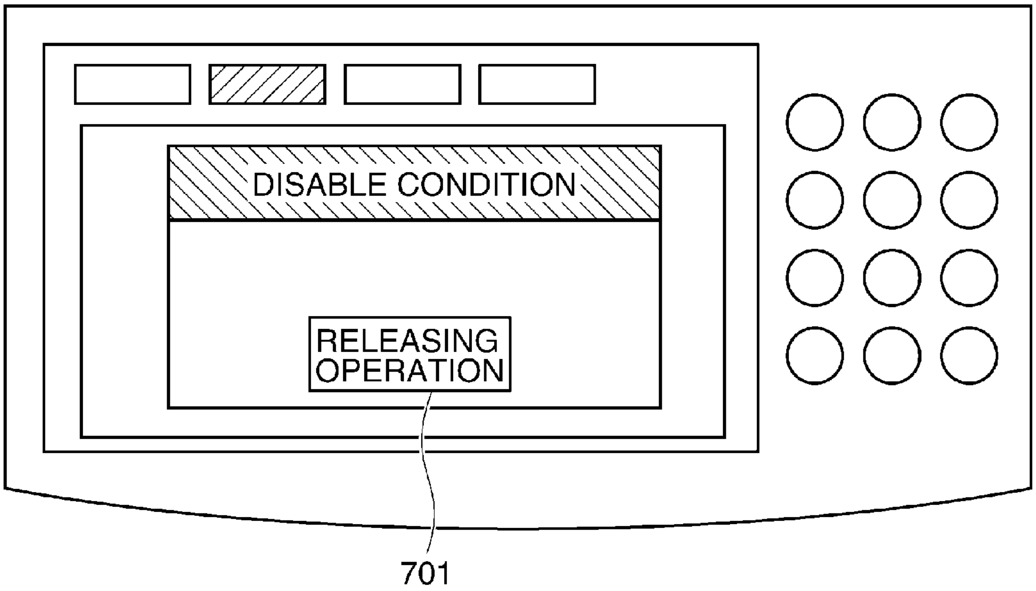
FIG. 7 is a view showing an example of a screen notifying that the multifunctional apparatus of FIG. 2 is in a disable condition.

When the work flow information has been registered, the CPU 201 displays a flow execution (releasing operation) button 701 for executing the registered work flow on the operation unit 221 in step S405 (FIG. 7). Then, in step S406, the CPU 201 determines whether the flow execution button was depressed or not. When the CPU 201 determines that the flow execution button was depressed, the CPU 201 executes the work flow displayed on the operation unit 221 in step S407.

Here, the step S401 functions as the acquisition unit for acquiring the expiration date information that is information about the expiration date of the information processing apparatus. Further, the step S402 functions as the first determination unit (step) that determines whether the expiration date acquired by the acquisition unit (step) expires or not.

Further, the step S403 functions as the limitation unit (step) that limits use of the information processing apparatus, when the first determination unit determines that the expiration date expires. Further, the CPU 201, the ROM 203, and the HDD 204 function as the registration unit (step) that registers the specific processing procedure executed by the information processing apparatus as the work flow information. The step S404 functions as the second determination unit (step) that determines whether the work flow information is registered. And the step S405 functions as the third determination unit (step) that determines whether a user instructs execution of the processing procedure of the work flow information concerned.

Further, the step S407 functions as the execution unit (step) that executes the processing procedure described in the work flow information under the condition where the limitation unit limits the use of the information processing apparatus, when the work flow information was registered and the user instructed the execution.

It should be noted that FIG. 5 shows a first work flow definition file 501 that describes the processing procedure that can be executed after the expiration date expires. The actual contents of the process are defined in the region divided by a tag of "<Workflow" indicated by a numeral 502 and a tag of "</Workflow>".

A numeral 503 shows an identifier for identifying the work flow information. In step S404, the multifunctional apparatus 104 determines whether the work flow information defines the processing procedure executed when the expiration date expires based on the identifier 503. Lines 504, 505, and 506 define processes that will be actually and sequentially executed, and are defined so that the processes will be executed in order of the lines 504, 505, and 506.

Figure 8:
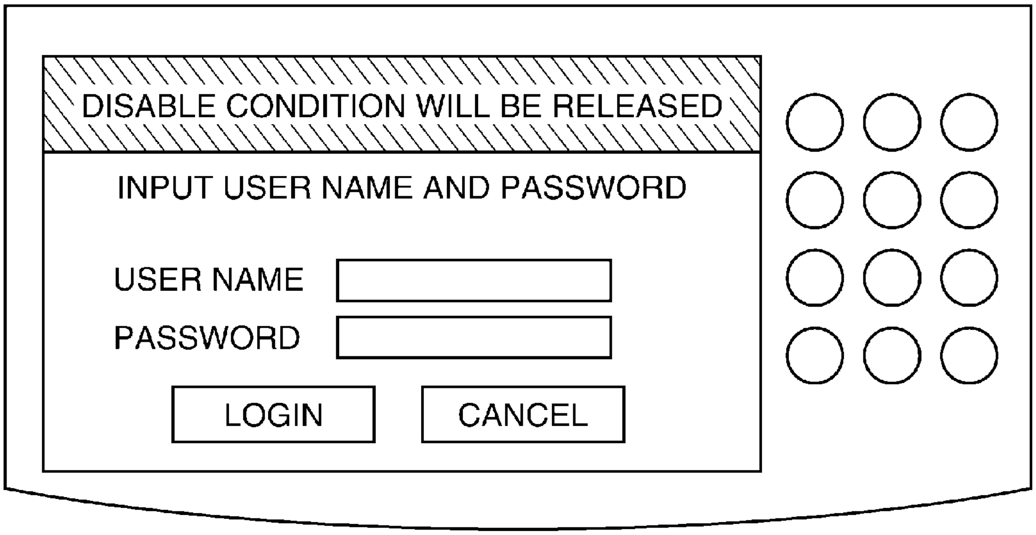
FIG. 8 is a view showing an example of a screen for authentication in the multifunctional apparatus of FIG. 2.

It should be noted that the line 504 defines that the authentication process is executed as a first process when executing the flow in the example of FIG. 5. Executing this process, an authentication screen as shown in FIG. 8 is displayed on the operation unit 221.

Figure 9:
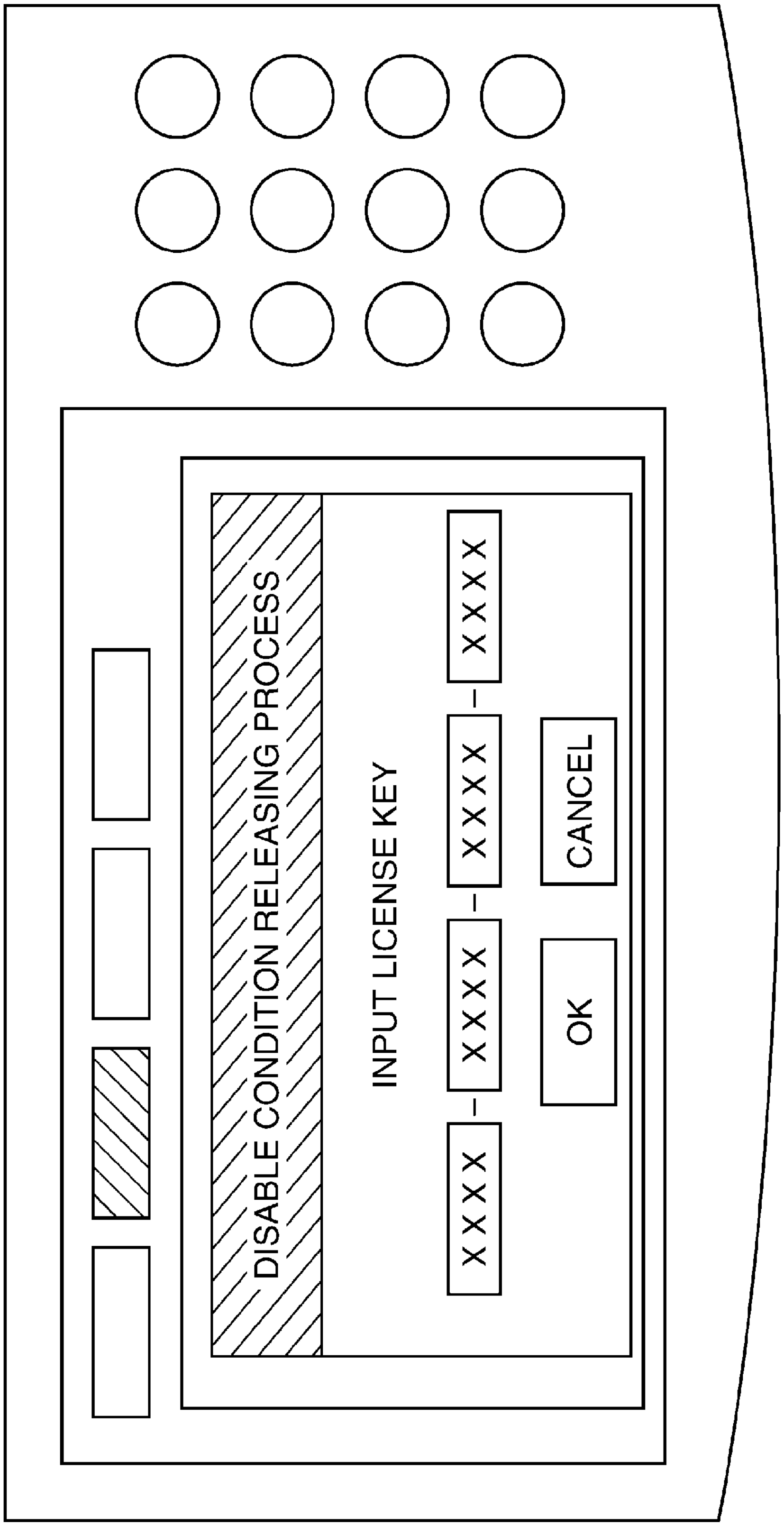
FIG. 9 is a view showing an example of a screen for inputting a release key into the multifunctional apparatus of FIG. 2.

Next, the line 505 defines the process to urge a user to input a license key that is necessary to release the disable condition (the use limitation condition) as shown in FIG. 9, and the process to release the disable condition when the inputted license key agrees with the release key that has been memorized in the multifunctional apparatus 104 beforehand. It should be noted that the release key is enciphered and registered into the storage area such as the HDD of the multifunctional apparatus 104, and can be changed by a manager. As a result, when the license key is stolen and used, for example, the manager changes the release key and issues a new license key corresponding to the changed release key to an authorized user. This can disable the stolen license key without interfering with use of the authorized user.

The line 506 defines the process for transmitting a processing history at the time of the flow execution to a predetermined transmission destination.

Although the example where the work flow information is registered in the HDD 204 of the multifunctional apparatus 104 is described in the embodiment, the work flow information may be registered in the server 106 in FIG. 1, for example.

In that case, the similar process can be realized by determining whether the work flow information is registered in the server 106 that holds the work flow information file in FIG. 1 in step S404.

It should be noted that the work flow information is configured so that it can be registered by the file format that is readability as shown in FIG. 5 and can be edited.

As a result, when a manager wants to change the processing procedure in the work flow information, for example, the manager can easily change the processing procedure by overwriting the file to save it after editing the file concerned. This enables to execute a process dependent on each user environment.

When the work flow information is registered in an external apparatus such as the server 106 in FIG. 1 and the same work flow information is registered in a plurality of apparatuses such as the multifunctional apparatuses 104 and 105, the work flow information can be defined by one operation.

Figure 6:
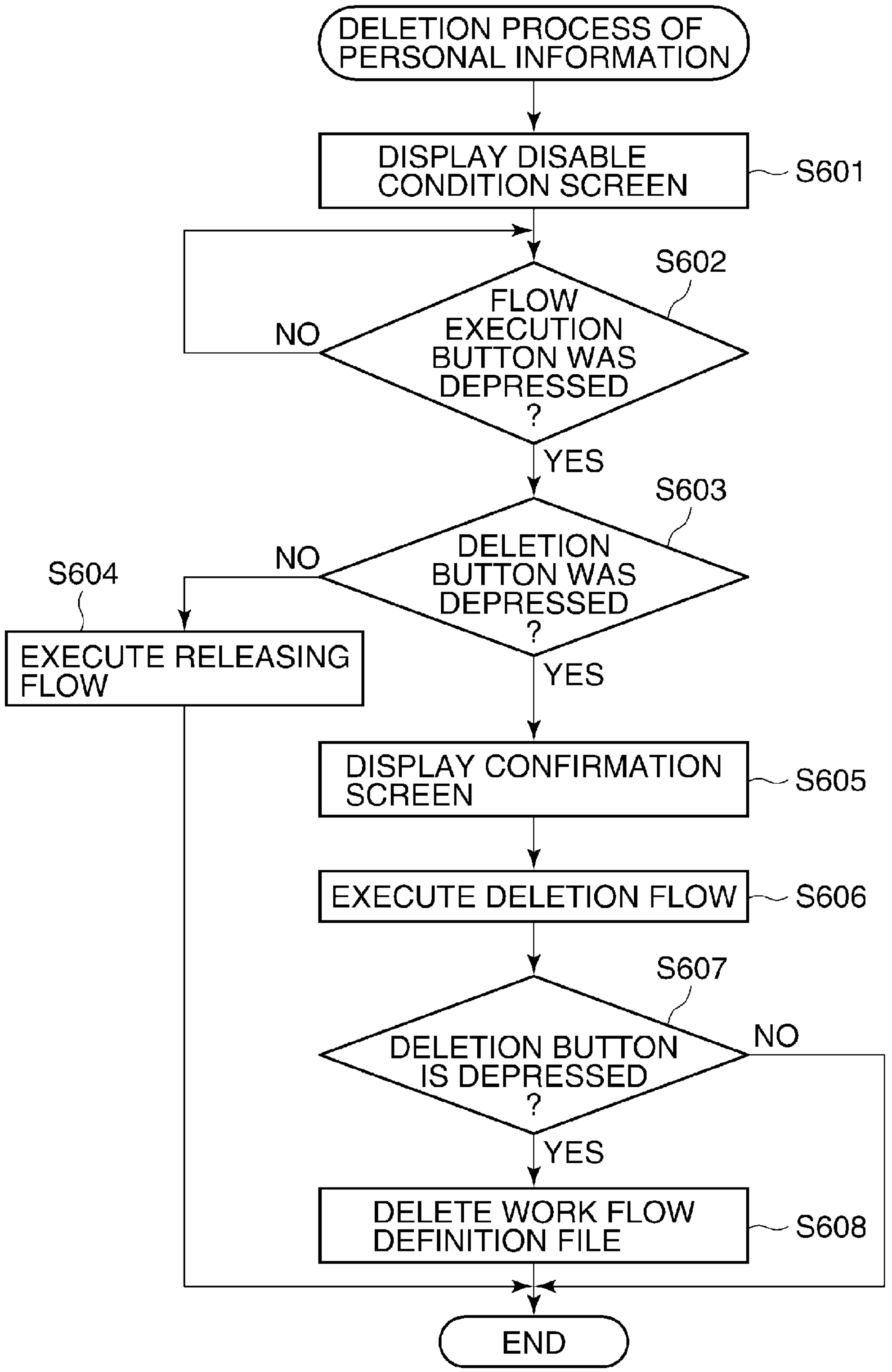
FIG. 6 is a flowchart showing a procedure of a deletion process of personal information such as user information executed by the multifunctional apparatus of FIG. 2.

FIG. 6 is a flowchart showing a procedure of a deletion process of personal information such as user information executed by the multifunctional apparatus of FIG. 2. The flowchart in FIG. 6 shows a processing procedure when the expiration date expires.

The control program of the deletion process is stored in the ROM 203 or the HDD 204 in the controller 200 in FIG. 2. The CPU 201 in the controller 200 executes the control program after loading it into the RAM 202.

It should be noted that the processing procedure of FIG. 6 is described on the assumption that the work flow definition file defining the processing procedure for releasing the use limitation and the work flow definition file defining the processing procedure for deleting the personal information are stored in the HDD 204 of the multifunctional apparatus 104 or 105 (hereinafter, represented by the multifunctional apparatus 104) or the storage device (not shown) of the server 106.

Figure 11:
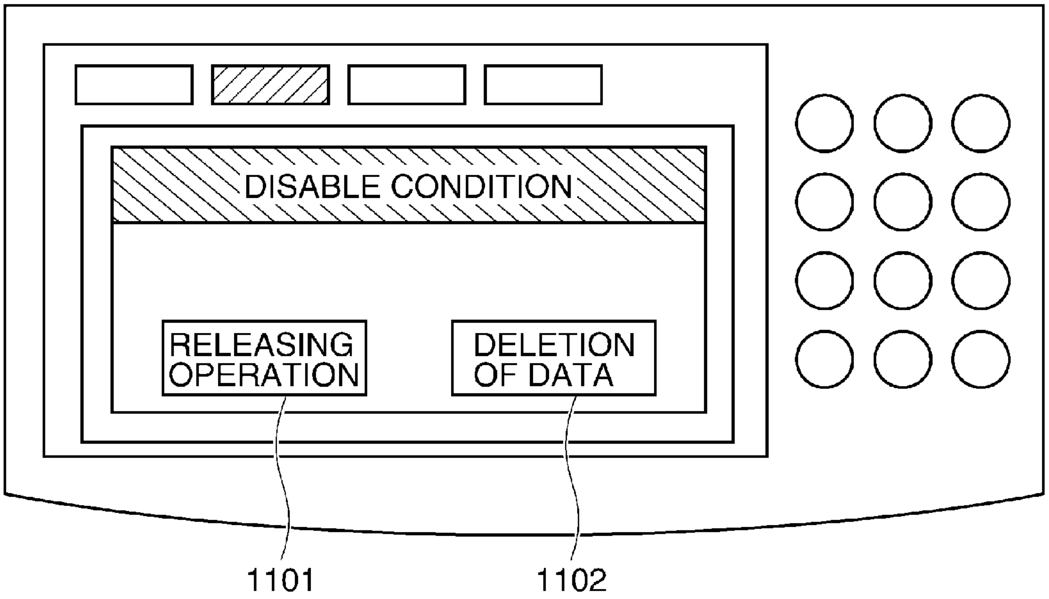
FIG. 11 is a view showing an example of a screen notifying that the multifunctional apparatus of FIG. 2 is in a disable condition.

First, in step S601, the multifunctional apparatus 104 under the disable condition displays the disable condition screen as shown in FIG. 11 on the operation unit 221.

In the example of the display screen of FIG. 11, a button (a release operation button 1101) for executing the flow releasing the disable condition, and a button (a data deletion button 1102) for executing the deletion process flow of the personal information data according to the present embodiment are displayed.

It should be noted that the data deletion button 1102 in FIG. 11 is not displayed when the work flow definition file of FIG. 10 (described below) for executing the deletion process flow concerned is not registered in the HDD 204 of the multifunctional apparatus 104 or the storage device of the server 106.

Next, in step S602, the CPU 201 determines whether the release operation button 1101 or the data deletion button 1102 shown in FIG. 11 has been depressed. When the CPU 201 determines that either button has been depressed, the CPU 201 proceeds with the process to step S603.

In step S603, the CPU 201 determines whether the depressed button is the data deletion button 1102 or not. When the depressed button is the data deletion button 1102, the CPU 201 proceeds with the process to step S605. When the depressed button is not the data deletion button 1102 but is the release operation button 1101, the CPU 201 proceeds with the process to step S604, executes the work flow for releasing the disable condition, and finishes the process.

The process beyond step S605 corresponds to the process steps according to the information of the work flow definition file shown in FIG. 10.

Before describing the process beyond step S605 in detail, the definition contents of the second work flow definition file of FIG. 10 will be described.

The second work flow definition file 1000 in FIG. 10 is a definition file that defines a series of process flows for executing the deletion process of the personal information data according to the embodiment.

A numeral 1001 in FIG. 10 denotes a title of the work flow definition file that is used so that a user identifies a desired work flow definition file from a plurality of work flow definition files easily.

A numeral 1002 denotes an identifier for identifying the work flow information. According to the identifier, the multifunctional apparatus 104 identifies that this work flow definition file defines the work flow of the data deletion process.

A numeral 1003 denotes a line that defines a number of times this work flow definition file can be executed. This example shows that the number of possible execution is one time.

Numerals 1004 and 1005 denote lines that define instructions for executing the data deletion process. A numeral 1006 denotes a line that defines whether the work flow definition file should be deleted when all the processes defined in the work flow definition file are completed. This example shows that the work flow definition file should be deleted.

Hereafter, the process beyond step S605 will be described according to the definition contents of the work flow definition file of FIG. 10.

Figure 12:
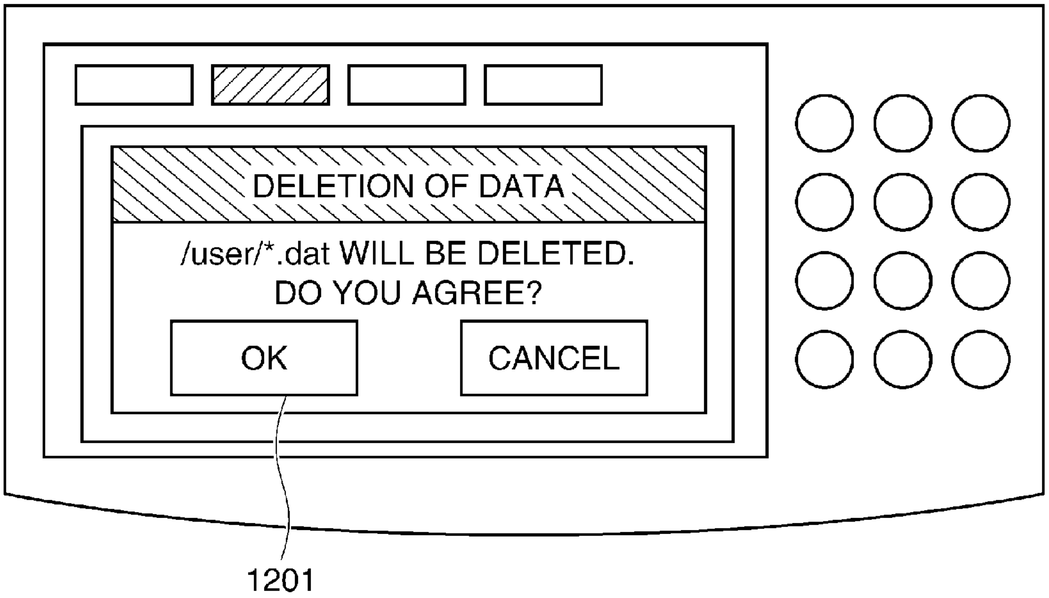
FIG. 12 is a view showing an example of the screen for deleting the data of the multifunctional apparatus of FIG. 2.

First, in step S605, the CPU 201 displays a confirmation screen shown in FIG. 12 on the operation unit 221 before executing the data deletion process defined in the lines 1004 and 1005 in FIG. 10.

When a user depresses the execution button 1201 in the confirmation screen of FIG. 12, the CPU 201 proceeds with the process to step S606 and deletes the data defined in the lines 1004 and 1005 in FIG. 10.

Figure 13:
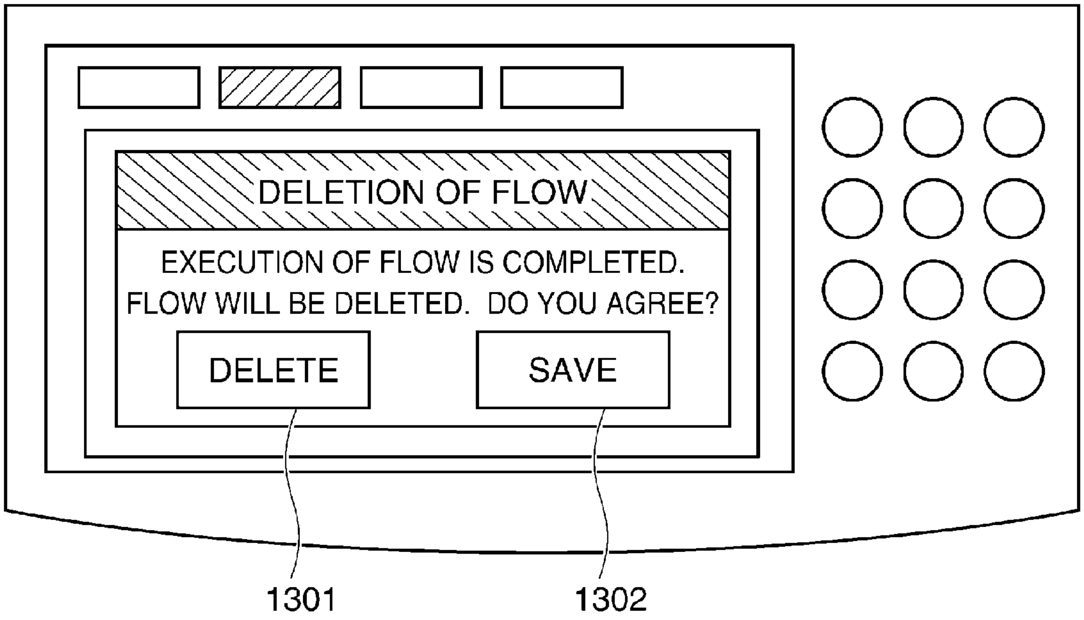
FIG. 13 is a view showing an example of the screen for deleting the flow definition file of the multifunctional apparatus of FIG. 2.

In step S607, the CPU 201 displays a confirmation screen shown in FIG. 13 on the operation unit 221 before executing the deletion process of the work flow definition file defined in the line 1006 in FIG. 10.

When the user depresses the deletion button 1301 in the confirmation screen of FIG. 13, the CPU 201 deletes the work flow definition file of FIG. 10 in step S608, and finishes the process.

Here, the CPU 201 and the HDD 204 function as the registration unit that registers the operation procedure or the processing procedure required to delete the personal information as the work flow information. The step S602 functions as the third determination unit that determines whether a user instructs execution of the processing procedure of the work flow information concerned.

The step S606 functions as the execution unit that executes the operation procedure or the processing procedure described in the work flow information registered by the registration unit, when determining that the personal information is deleted in step S603.

It should be noted that the CPU 201 finishes the process without executing the deletion process of the work flow definition file defined in the line 1006, when a user has depressed a save button 1302 in the confirmation screen of FIG. 13.

It should be noted that the processing steps are simplified for describing emphatically the flow of the deletion process of the personal information data such as user information in FIG. 6. However, the process may be configured so that a user can select a desired deletion process flow among a plurality of deletion process flows of the personal information data defined beforehand.

In this case, the CPU 201 displays a screen for selecting the work flow definition file that deletes the registered data on the operation unit 221 after depressing the data deletion button 1102 in FIG. 11, and before executing the step S605. And the process is configured so that the CPU 201 executes the steps beyond the step S605 after the user selects a desired definition file.

Further, if a work flow definition file is referred to from another work flow definition filer a new work flow definition file is created by combining a plurality of work flow definition files, which allows to create a work flow definition file more efficiently.

As described above, according to the process of FIG. 4, it becomes possible to stop use of the multifunctional apparatus according to the expiration date set up beforehand. Further, it becomes possible to use the multifunctional apparatus under the disable condition after executing a series of user-desired releasing procedures in the steps S404 and S405.

This enables to increase effectiveness of preventing unauthorized releasing operations as compared with the case having only the statically defined releasing means such as an input of a license key as the prior art.

According to the process of FIG. 6, especially, the process beyond the step S605, the complicated data deletion operations can be executed certainly. Therefore, when a user scraps or returns an information processing apparatus whose expiration date expires, it becomes possible to avoid risks, such as a leakage of personal information.

While the present invention has been described with reference to exemplary embodiments and it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2008-179053, filed on Jul. 9, 2008, which is hereby incorporated by reference herein in its entirety.

What is claimed is:

1. An information processing apparatus comprising:

an acquisition unit adapted to acquire information about an expiration date of the information processing apparatus;

a first determination unit adapted to determine whether the expiration date of the apparatus expires or not based on the information acquired by said acquisition unit;

a limitation unit adapted to limit use of the information processing apparatus when said first determination unit determines that the expiration date expires;

a registration unit adapted to register a specific processing procedure that is executed by the information processing apparatus as work flow information;

a second determination unit adapted to determine whether the work flow information has been registered;

a third determination unit adapted to determine whether a user instructs an execution of the previously registered specific processing procedure of the work flow information concerned when said second determination unit determines that the work flow information has been registered; and an execution unit adapted to execute the previously registered specific processing procedure described in the work flow information under the condition where the use of the information processing apparatus is limited by said limitation unit, when said third determination unit determines that the user instructs the execution of the previously registered specific processing procedure, wherein the use of the processing apparatus remains limited after the execution unit executes the previously registered specific processing procedure.

2. The information processing apparatus according to claim 1, wherein said registration unit registers the processing procedure for releasing the use limitation of the information processing apparatus by said limitation unit as a work flow.

3. The information processing apparatus according to claim 1, wherein said registration unit registers an operating procedure or a processing procedure required for deleting personal information as the work flow information.

4. A control method for an information processing apparatus, comprising:

an acquisition step of acquiring information about an expiration date of the information processing apparatus;

a first determination step of determining whether the expiration date of the apparatus expires or not based on the information acquired in said acquisition step;

a limitation step of limiting use of the information processing apparatus when it is determined that the expiration date expires in said first determination step;

a registration step of registering a specific processing procedure that is executed by said information processing apparatus as work flow information;

a second determination step of determining whether the work flow information has been registered;

a third determination step of determining whether a user instructs an execution of the previously registered specific processing procedure of the work flow information concerned when it is determined that the work flow information has been registered in said second determination step; and an execution step of executing the previously registered specific processing procedure described in the work flow information under the condition where the use of the information processing apparatus is limited in said limitation step, when it is determined that the user instructs the execution of the previously registered specific processing procedure in said third determination step, wherein the use of the processing apparatus remains limited after the executing of the previously registered specific processing procedure.

* * * * *